United States Patent
Sehgal et al.

(10) Patent No.: US 6,659,722 B2
(45) Date of Patent: Dec. 9, 2003

(54) COMPOSITE ROTOR BLADE AND METHOD OF MANUFACTURE

(75) Inventors: Ajay Sehgal, Patuxent River, MD (US); Eric C. Boyle, Haslet, TX (US); Christopher Finch, Ft. Worth, TX (US); Robert S. Thompson, Mansfield, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/976,615

(22) Filed: Oct. 12, 2001

(65) Prior Publication Data

US 2002/0164251 A1 Nov. 7, 2002

Related U.S. Application Data

(60) Provisional application No. 60/289,099, filed on May 7, 2001.

(51) Int. Cl.[7] .............................................. B64C 27/473
(52) U.S. Cl. .................................. 416/134 A; 416/230
(58) Field of Search .......................... 416/134 A, 134 R, 416/135, 230, 226, 239, 241 A, 155; 29/889.71

(56) References Cited

U.S. PATENT DOCUMENTS

| | | | |
|---|---|---|---|
| 3,782,856 A | * | 1/1974 | Salkind et al. ............ 416/230 X |
| 4,095,322 A | | 6/1978 | Scarpati et al. ............ 29/156.8 |
| 4,098,559 A | | 7/1978 | Price .......................... 416/230 |
| 4,316,701 A | | 2/1982 | Scarpati et al. ............ 416/226 |
| 4,349,316 A | | 9/1982 | Hughes et al. .............. 416/104 |
| 5,041,182 A | | 8/1991 | Sekiguchi et al. .......... 156/245 |
| 5,222,297 A | | 6/1993 | Graff et al. ............... 29/889.71 |
| 5,277,548 A | | 1/1994 | Klein et al. ............. 416/193 A |
| 5,346,367 A | | 9/1994 | Doolin et al. ............... 416/230 |
| 5,645,400 A | | 7/1997 | Hunter et al. ........... 416/134 A |
| 5,738,494 A | * | 4/1998 | Schmaling .............. 416/134 A |
| 5,820,344 A | * | 10/1998 | Hamilton et al. ........ 416/134 A |
| 5,939,007 A | * | 8/1999 | Iszczyszyn et al. ......... 156/156 |
| 6,056,838 A | * | 5/2000 | Besse et al. ............ 416/230 X |
| 6,263,936 B1 | * | 7/2001 | Moore et al. ............... 156/349 |

* cited by examiner

*Primary Examiner*—Edward K. Look
*Assistant Examiner*—Richard A. Edgar
(74) *Attorney, Agent, or Firm*—James E. Walton

(57) ABSTRACT

The present invention comprises a rotor blade and method of manufacture thereof. The rotor blade of the present invention incorporates a number of novel features in order to increase its reliability and strength while reducing its weight. In certain embodiments, the rotor blade of the present invention incorporates a flexural strap in place of traditional pitch bearings. In certain embodiments, the rotor blade of the present invention is manufactured using a unique fiber placement layup technique to reduce failure modes and maximize the fatigue strength of the part.

7 Claims, 12 Drawing Sheets

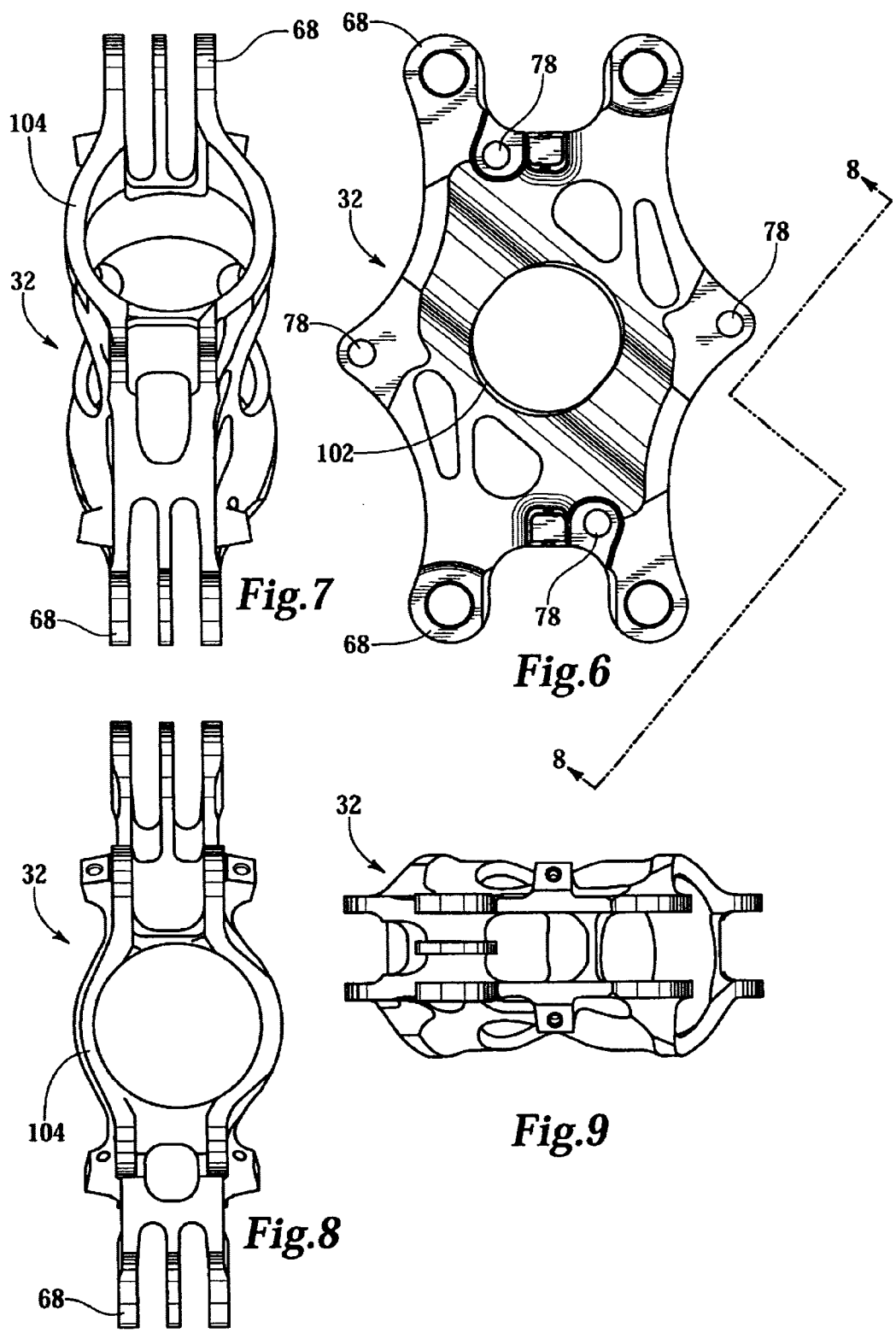

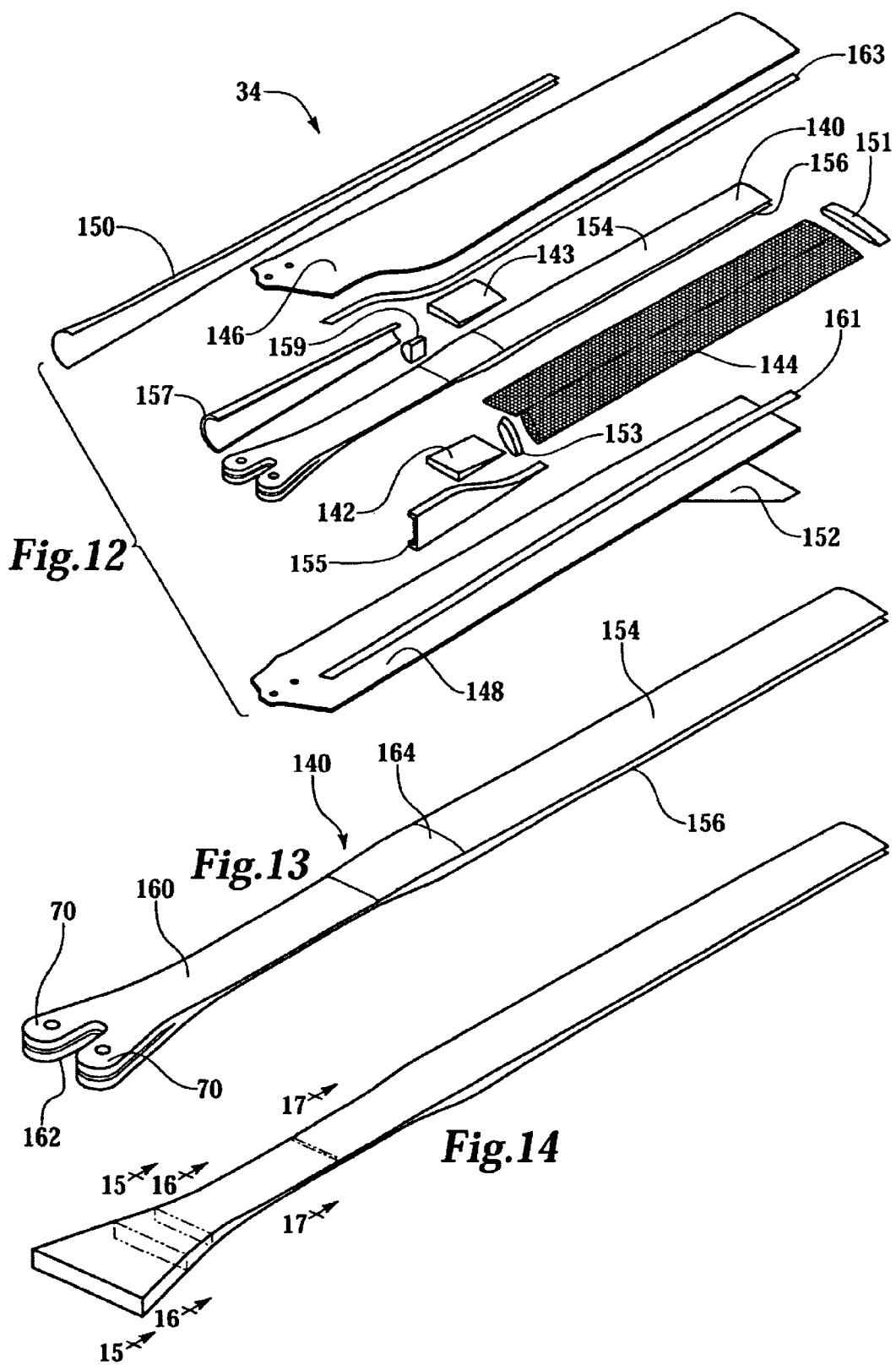

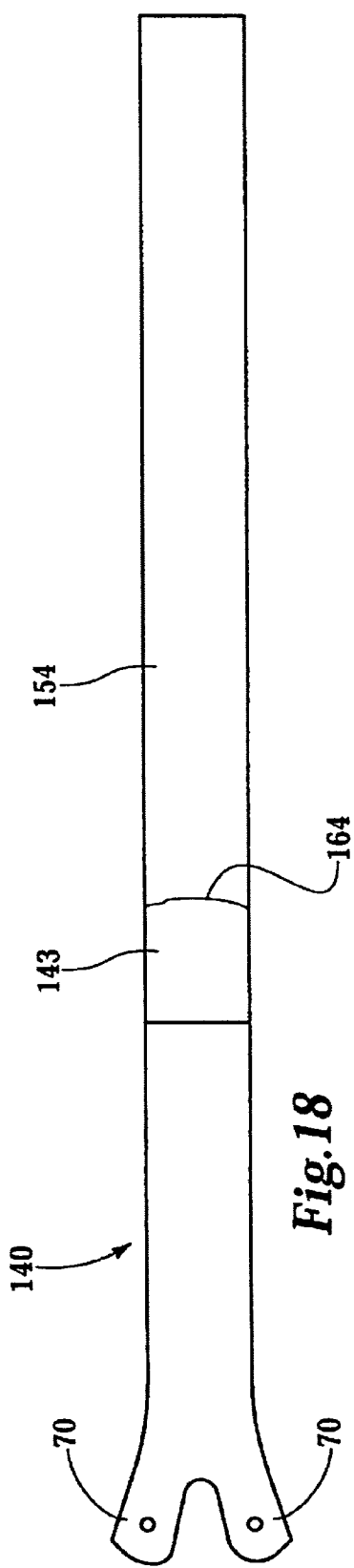
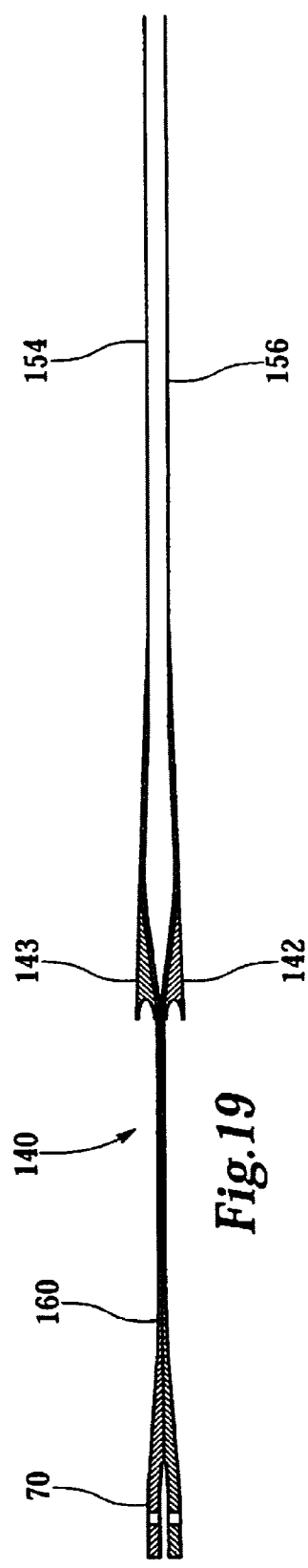
Fig.18
Fig.19

COMPOSITE ROTOR BLADE AND METHOD OF MANUFACTURE

TECHNICAL FIELD OF THE INVENTION

This application claims priority from provisional application Serial No. 60/289,099 for "Composite Rotor Blade and Method of Manufacture," filed May 7, 2001. The present invention relates generally to the field of aircraft rotors, and in particular to a rotor blade design for use in a helicopter or similar aircraft.

BACKGROUND OF THE INVENTION

Helicopters generally incorporate at least two rotors into their design. The large rotor providing thrust in the vertical direction is known as the main rotor. In addition to this main rotor, the traditional helicopter design incorporates a tail rotor system to counteract the torque from the main rotor system. Although operable helicopter designs have been produced without the traditional tail rotor geometry, the vast majority of helicopters use this design. The number of blades in the tail rotor itself will depend on the requirements of a particular application.

In certain tail rotor designs, the thrust developed by the tail rotor is a function of the pitch of the rotor blades. Accordingly, many such designs incorporate variable-pitch rotors so as to adjust the tail rotor thrust in flight. Most such designs have traditionally employed some form of bushings or bearings about which each of the rotor blades pivots. Typical examples of such bearings include elastomeric, PTFE-lined, and grease-lubricated bearings. Generally such designs incorporate a separate tail rotor blade and tail rotor hub.

Because of the loading on those bearings and because of the type of materials used in their construction, there can be a considerable degree of static friction, or "stiction" associated with such bearings. This stiction can make fine control of the rotor pitch difficult or impossible in many situations, as the pilot must place considerable force on the pitch controls in order to overcome the static friction. This degree of force will often cause overshoot of the desired blade pitch, so that additional adjustment is required.

As the tail rotor is designed to counteract the induced torque of the main rotor, the pitch of the tail rotor blades must be adjusted whenever the torque on the main rotor is adjusted, in order to ensure that the aircraft remains "trimmed". The repeated adjustment and readjustment of the blade pitch induces undesirable "pilot induced oscillations", or "PIOs." These oscillations are known to compromise the integrity of the aircraft's flight, and may result in potentially hazardous situations.

Additionally, there are a number of failure modes associated with the use of traditional tail rotor bearings. It has been found that a failure in the primary load path, in which the centrifugal force acts, can cause a catastrophic failure of one or more components in the tail rotor, including bearings, bearing support structures, or the rotor yoke itself. It has also been found that such catastrophic failure can occur without any warning to the pilot during flight, and that such failure can occur without any discernable sign of impending failure, such as could be discovered by close inspection. Additionally, it has been found that the reasonable life expectancy of the tail rotor bearings is generally between 200 to 1,000 hours, such that these components represent a considerable maintenance burden.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention relates to a composite rotor blade and method of manufacture of the same. Although the rotor blade of the present invention is described in connection with the tail rotor of a helicopter, it will be understood by those of skill in the art that the inventive concepts embodied herein are applicable to a wide variety of applicable contexts and should not be considered limited to the specific applications described herein.

The present invention relates to a composite tail rotor blade that provides higher aerodynamic performance, provides damage tolerant design with extended life expectancy, and reduced maintenance burden due to the use of composite materials. In various embodiments, the design uses a composite twist strap flexure to accommodate collective pitch control, integral with each blade.

As described above, traditional rotor blades differ from the design of the embodiment disclosed herein in that they rely on rotary bearings between the yokes and the blades to accommodate the pitch change motion of the blades relative to the yokes. In the embodiments of the present invention disclosed herein, the blades are fixed to the yokes, which are in turn fixed to the rotor mast, with no provision within the hub assembly for accommodation of rotor blade pitch. Each rotor blade incorporates an integral flexing strap, which replaces the functionality of the bearings found in traditional prior art designs by flexing about the lengthwise axis of rotor blade, so as to allow for adjustment of the pitch of the rotor blade without pitch change bearings.

The present invention achieves a reduction or elimination of static friction and increased service life of the tail rotor mechanisms through the replacement of the rotary bearings with the flexural members. In certain embodiments, the present invention also achieves a reduction or elimination of catastrophic failure modes by the incorporation of redundant load paths within the rotor structure. In certain embodiments, the tail rotor of the present invention may be employed in a "pusher" implementation for improved aerodynamic performance by minimizing vertical fin blockage effects.

In certain embodiments, the rotor blade of the present invention reduces the likelihood of failure at the part edge due to a novel and unique fiber placement lay-up technique wherein the reinforcement fibers within each composite belt are aligned with, and follow, the outside edges of the part. With this design, few or none of the reinforcement fibers run off the edge of the part, but rather follow the contours of the part and direct the stress through the structure of the part in a desirable manner.

The teachings of the present invention may provide improved aerodynamic efficiency, higher maneuvering capability, improved mechanical flaw tolerance design and extended life expectancy. In one embodiment, a tail rotor constructed according to the present invention has been designed to achieve a minimum life of 10,000 hours of severe duty use in ground-air-ground maneuvers, air combat maneuvers, and high cycle vibratory loads, with little or no maintenance.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIGS. 6–9 are principal axis views of a tail rotor yoke suitable for use with certain embodiments of the present invention;

FIG. 12 is an exploded view of a tail rotor blade according to certain embodiments of the present invention;

FIG. 13 is an isometric view of a machined flexural strap according to certain embodiments of the present invention;

FIG. 14 is an isometric view of an unmachined flexural strap according to certain embodiments of the present invention;

FIG. 18 is a top view of a flexural strap and block assembly according to certain embodiments of the present invention;

FIG. 19 is a side view of a flexural strap and block assembly according to certain embodiments of the present invention;

DETAILED DESCRIPTION OF THE INVENTION

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The present invention makes use of a variety of novel features to overcome the inherent limitations of the prior art. The present invention achieves a reduction or elimination of static friction and increased service life of the tail rotor mechanisms through the replacement of rotary bearings with flexural members. In certain embodiments, the present invention achieves a reduction or elimination of catastrophic failure modes within the composite structure through the use of the fiber placement technique described below.

Figure 1:
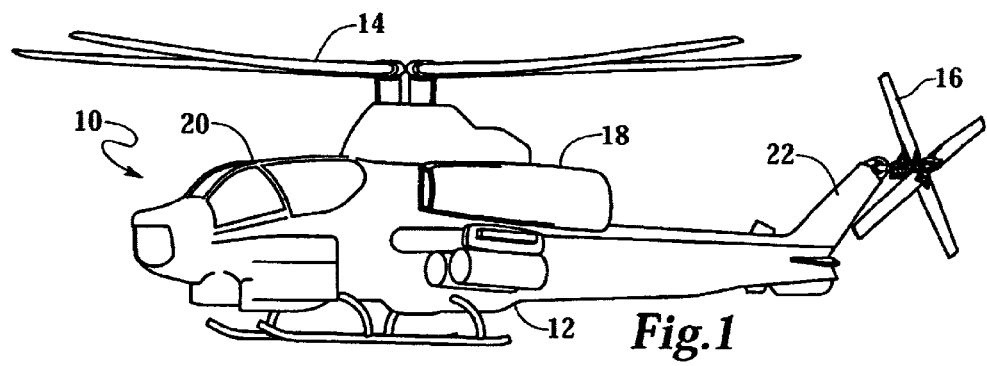
FIG. 1 is a side view of an aircraft suitable for use with certain embodiments of the present invention.

An aircraft incorporating one embodiment of the present invention is shown in FIG. 1 and generally designated 10. Aircraft 10 comprises a fuselage 12 lifted by a main rotor 14. Torque imparted to fuselage 12 by main rotor 14 is countered by tail rotor 16 mounted on the tail fin 22 of fuselage 12. Main rotor 14 and tail rotor 16 are powered by engines 18 under the control of a pilot in cockpit 20.

Figure 2:
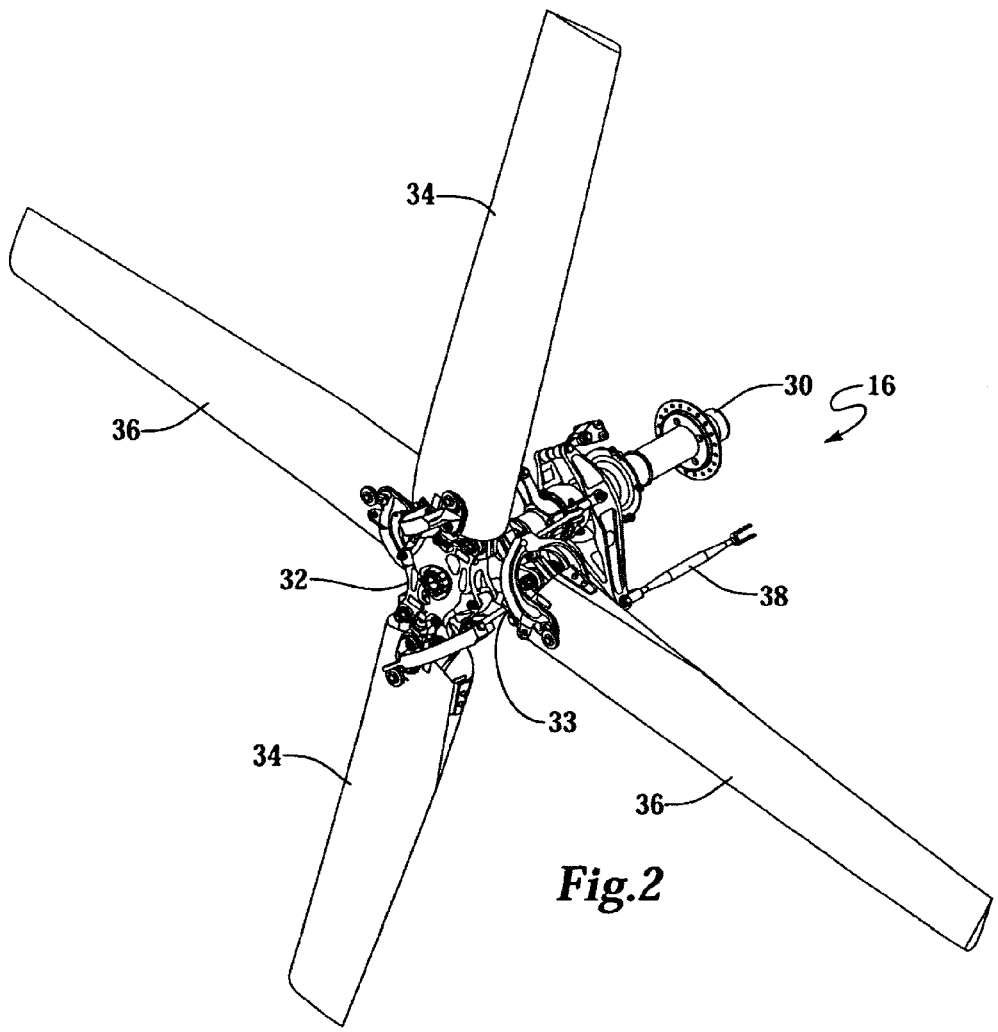
FIG. 2 is an isometric view of a tail rotor assembly suitable for use with certain embodiments of the present invention.
Figure 3:
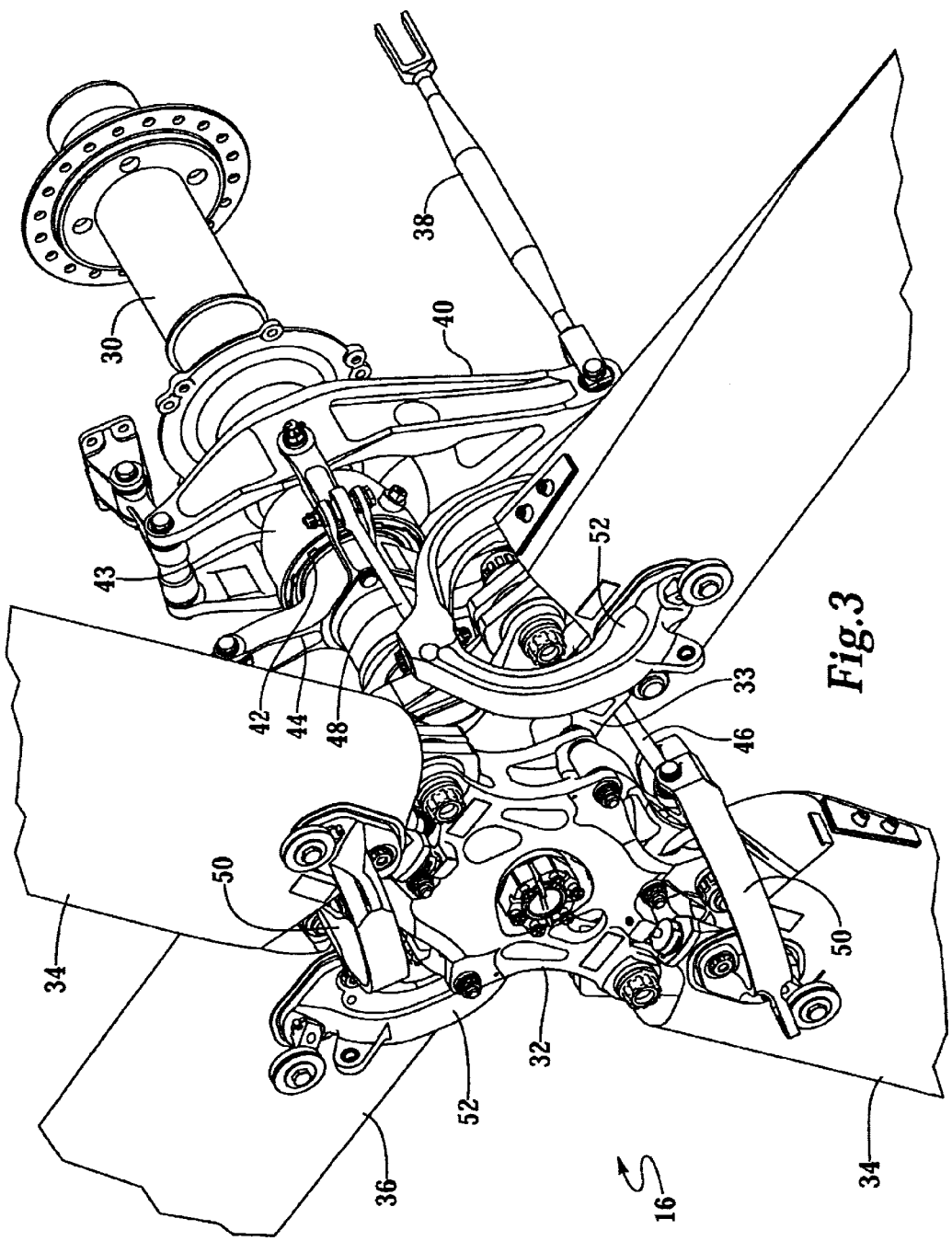
FIG. 3 is a detailed isometric view of a tail rotor hub assembly suitable for use with certain embodiments of the present invention.
Figure 4:
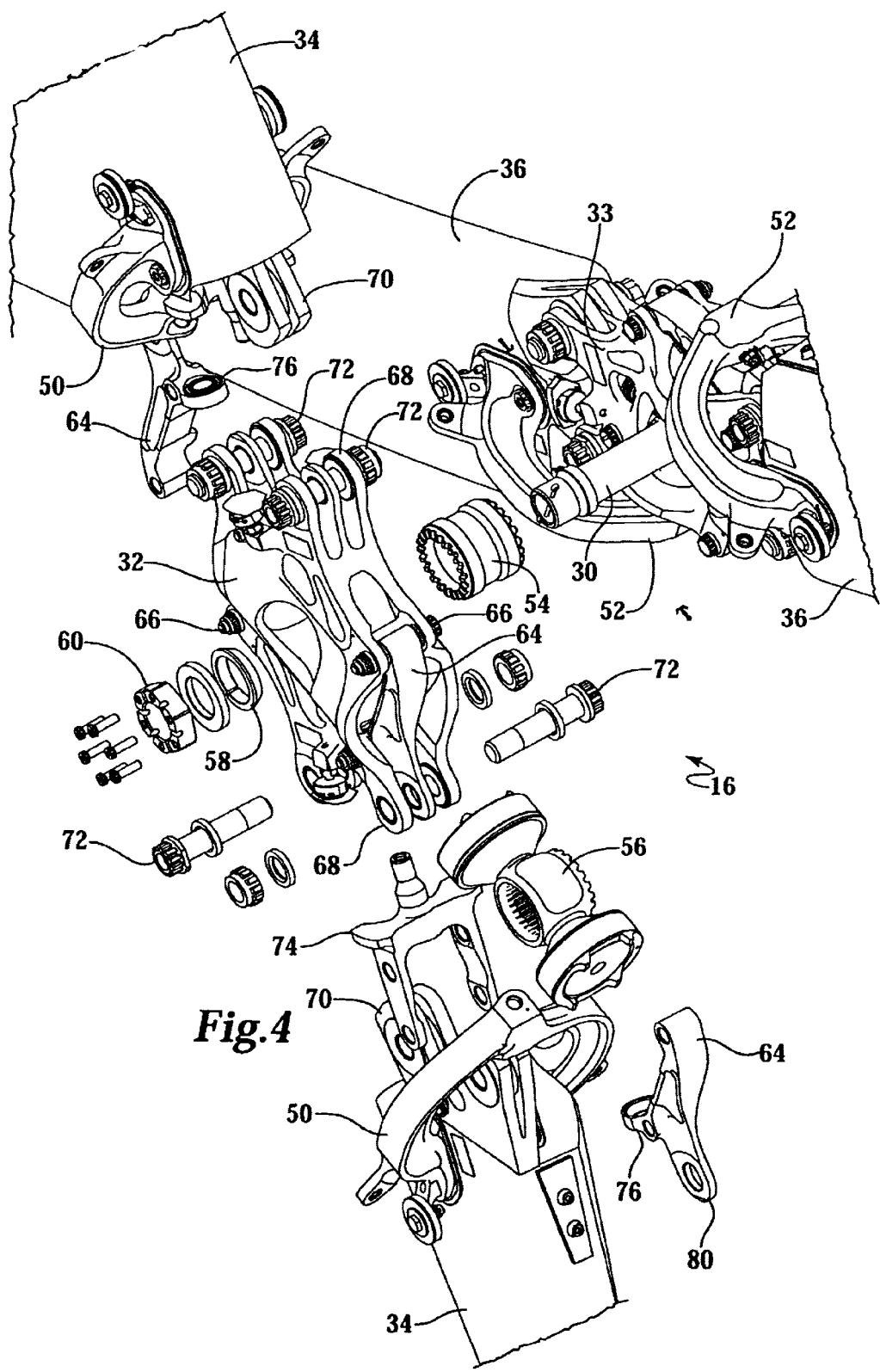
FIG. 4 is an exploded view of a tail rotor hub assembly suitable for use with certain embodiments of the present invention.

An isometric view of the tail rotor 16 of the aircraft 10 of FIG. 1 is shown in FIG. 2. A detailed view of the hub assembly of tail rotor 16 is shown in FIG. 3. An exploded view of the hub assembly of tail rotor 16 is shown in FIG. 4. As seen in FIGS. 2–4, tail rotor 16 comprises a mast 30 connected to an outboard yoke 32 and an inboard yoke 33 through trunnion/bearing assemblies 56. Outboard yoke 32 is connected to two outboard blades 34, while inboard yoke 33 is connected to two inboard blades 36.

As seen in FIGS. 2–4, the hub assembly of tail rotor 16 consists of two identical rotor assemblies, inboard and outboard, connected by a hub adapter 54 and secured to the mast 30 by mast nut 60. The outboard yoke assembly consists of a yoke 32, a trunnion and elastomeric flapping bearing assembly 56, and two retention fittings 64. In certain embodiments, the inboard yoke assembly is identical to the outboard yoke assembly.

In this design, each yoke assembly uses an elastomeric bearing to accommodate rotor-flapping motions. Additionally, each trunnion/bearing assembly 56 provides load paths for rotor torque and thrust. Each trunnion/bearing assembly 56 consists of two conical elastomeric/metal bearings molded to a stainless steel trunnion.

In addition to the above-described structure, tail rotor 16 incorporates a shear spindle 74 bolted to the inboard end of each blade 32 to provide a blade shear load path to a bearing 76 housed in the corresponding restraint fitting 64. The shear spindle 74 incorporates coning stops to limit blade coning when the rotor 16 is not turning. The coning stops are designed to prevent damage by strong side gust winds when the aircraft 10 is parked.

In addition to the above-described distinctions, tail rotor 16 makes use of a bearingless pitch mechanism for accommodation of rotor pitch. Traditional rotor assemblies differ from the design of the embodiment shown in FIGS. 2–4 in that they rely on rotary bearings between the yokes 32 and 33 and the blades 34 and 36 to accommodate the pitch change motion of the blades 34 and 36 relative to the yokes 32 and 33.

In the embodiment shown in FIGS. 2–4, it can be seen that blades 34 and 36 are fixed to the yokes 32 and 33, which are in turn fixed to the mast 30, with no provision within the hub assembly for accommodation of rotor blade pitch. Each rotor blade 34 and 36 incorporates an integral flexing strap, which replaces the functionality of the bearings found in traditional prior art designs by flexing about the lengthwise axis of rotor blade 16, so as to allow for adjustment of the pitch of the rotor blade 16 without pitch change bearings.

In the embodiment shown in FIGS. 2–4, the rotating controls are oriented coaxially to the tail rotor mast 30 and are located outside of mast 30. The control system consists of a rotating crosshead 44, thrust bearing 42, thrust bearing housing 43, input lever 40, and pitch links 46 and 48. Blade pitch is controlled by the four-clevis pitch control crosshead 44 that, through four pitch links 46 and 48, transmits control inputs from the non-rotating system to the cuff-mounted "ring" shaped pitch horns 50 and 52. Thrust bearing 42, along with a system of links and levers, provides an interface between the non-rotating and rotating control system.

The pitch of blades 34 and 36 is controlled by the pilot through pitch control input link 38, which actuates pitch control input lever 40. In the embodiment shown in FIGS. 2-4, pitch control input lever 40 actuates pitch control thrust bearing housing 42 through a linkage providing approximately a 3:1 mechanical advantage over pitch control thrust bearing housing 42. One side of pitch control thrust bearing housing 42 is fixed to pitch control input lever 40, while the other side is fixed to, and rotates with, pitch control crosshead 44, which is fixed to mast 30.

Pitch control crosshead 44 actuates outboard pitch horns 50 and inboard pitch horns 52 through outboard pitch links 46 and inboard pitch links 48, respectively. Pitch horns 50 and 52 are rigidly mounted to the external surface of blades 34 and 36, respectively, so that the motion imparted to pitch horns 50 and 52 is directly imparted to blades 34 and 36, respectively. Pitch change motion imparted by pitch horns 50 and 52 is accommodated by integral straps within each blade 34 and 36, which flex in response to pilot input. As described above, this design is in contrast to traditional rotor designs that incorporate pitch bearings to accommodate the pitch change motion.

Figure 5:
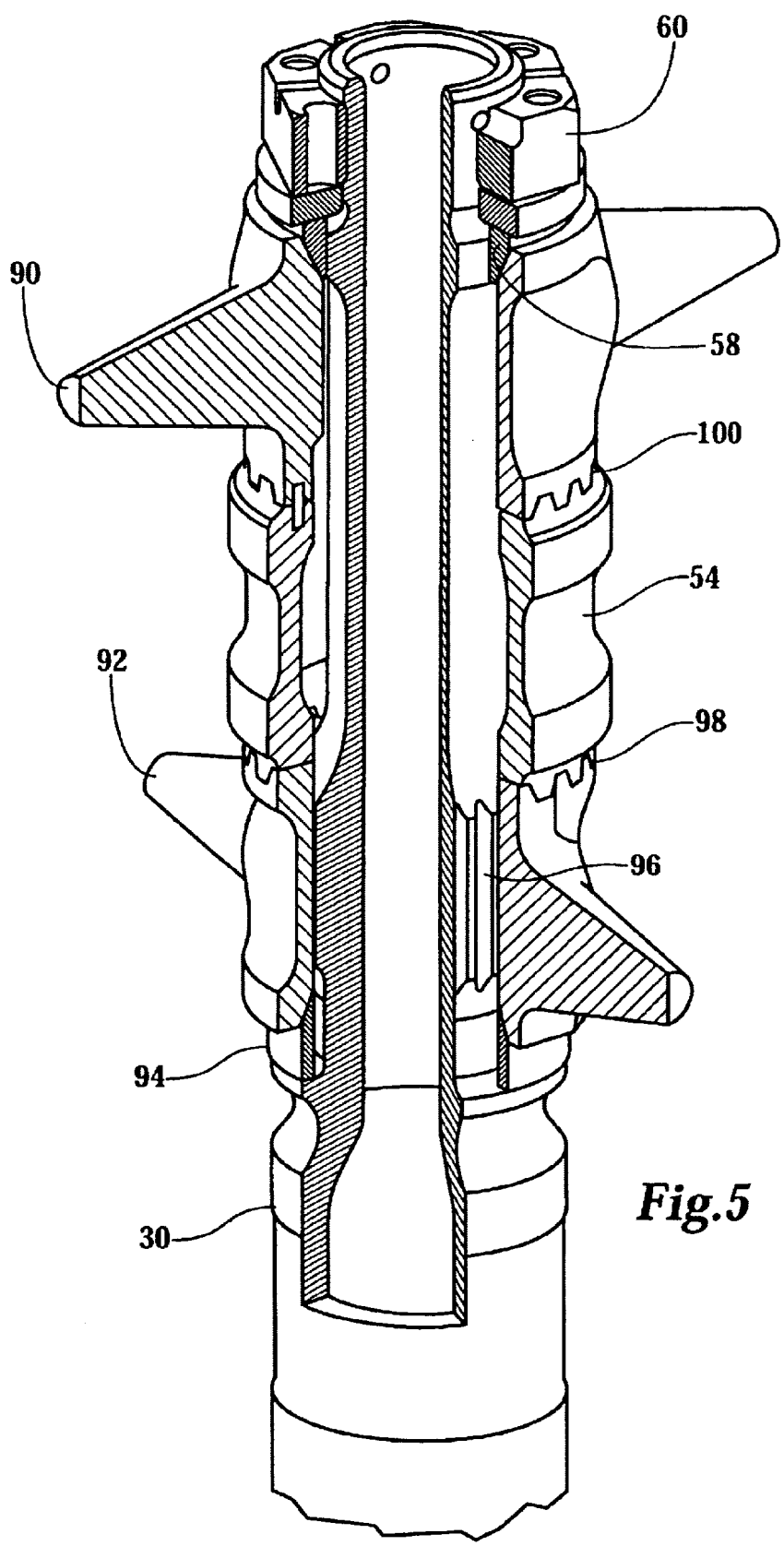
FIG. 5 is a cut-away view of a tail rotor mast and trunnion assembly suitable for use with certain embodiments of the present invention.

One embodiment of a trunnion-to-mast attachment structure suitable for use with the present invention is shown in detail in FIG. 5. The inboard trunnion 92 and outboard trunnion 90 are clamped together on the mast 30 using a pair of tapered cones 58 and 94, hub adapter 54, and mast nut 60. The tail rotor mast 30 transmits drive torque to the inboard trunnion 92 by means of a spline section 96. The inboard trunnion 92 has mating splines on its inside surface to mate with mast spline section 96, and curvic teeth on its outboard face to mate with the corresponding teeth on the hub adapter 54.

A cone set 94 between the inboard trunnion 92 and inboard shoulder of the mast 30 provides positive centering of the inboard trunnion 92 and locks out radial looseness in the spline section 96. The drive torque is transmitted to the outboard trunnion 90 from the inboard trunnion 92 through a hub adapter 54 having an inboard curvic coupling 98 mating with the inboard trunnion 92 and an outboard curvic coupling 100 mating with the outboard trunnion 90. A second cone set 58 between the outboard trunnion 90 and the mast nut 60 provides centering of the outboard trunnion 90.

FIGS. 6–9 depict principal axis views of one embodiment of an outboard yoke 32 suitable for use with the present invention. Yoke 32 transfers torque to the blades 34, reacts rotor loads, and transfers blade thrust to the mast 30 through trunnion/bearing assembly 56. In certain embodiments, yoke 32 is made from a titanium forging.

The yoke 32 has multiple lugs 68 with redundant load paths at each end. Each pair of lugs is designed to attach a blade 34 to yoke 32. As assembled, therefore, a complete outboard rotor assembly consists of a yoke 32 connected to two blades 34 separated by 180 degrees. Each blade 34 is attached to the yoke lugs 68 with two bolts 72 in a multiple shear connection.

Mast 30 passes through mast bore 102, which provides adequate clearance for normal operation and also provides integral stops to limit hub flapping motion. A bearing bore 104, orthogonal to mast bore 102 and indexed to the pitch change axis to provide the required delta 3 angle, houses an elastomeric flapping bearing/trunnion assembly 56. In one embodiment, the bearing bore is indexed at 40 degrees to the pitch change axis. As assembled, a restraint fitting 64 is assembled to the yoke 32 at each end of the bearing bore 104, which provides an axial pre-load across the bearing/trunnion assembly 56. As seen in FIG. 4, a restraint fitting 64 is held in place by two bolts 66 inserted in bores 78. In certain embodiments, an additional lug 80 integral to restraint fitting 64 provides one of the redundant load paths for the blade-to-yoke attachment.

Figure 10:
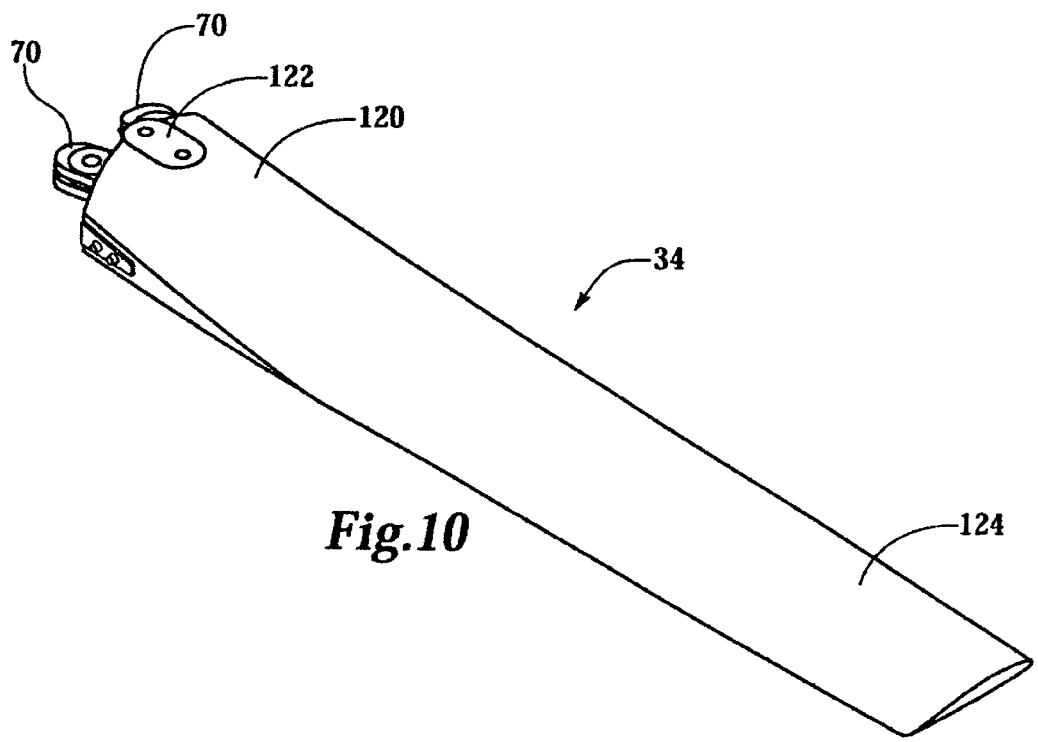
FIG. 10 is an isometric view of a rotor blade according to certain embodiments of the present invention.

An isometric view of a single rotor blade 34 of the tail rotor 16 of FIGS. 2–4 is shown in FIG. 10. Blade 34, while in certain embodiments manufactured as a single part, consists of three distinct portions. Blade 34 comprises integral cuff 120 and outboard blade section 124. An integral twist strap (not shown) within the cuff 120 functions as the main centrifugal force load path for the blade 34 and accommodates both pitch change and coning motions. The integral twist strap is rigidly bolted to yoke lugs 68 through blade lugs 70.

As described above in connection with FIGS. 2–4, integral cuff 120 interfaces with rotor yoke 32 through a shear spindle 74 bolted to its upper and lower faces at interfaces 122, and delivers control system pitch inputs to the blade 32 through a ring-shaped pitch horn 50 also mounted to the cuff 120. The outboard blade section 124 generates the aerodynamic thrust for the tail rotor blade 34.

The integral strap replaces the bearings found in traditional prior art designs. In certain embodiments, the integral strap is designed to withstand all centrifugal or radial loading on the rotor blade 34 as well as all static and dynamic bending loads acting on the rotor blade 34. The integral strap is designed to accommodate flexing about the lengthwise axis of rotor blade 34, so as to allow for adjustment of the pitch of the rotor blade 34. Although rotor blade 34 is shown in FIGS. 2–4 as part of a four-blade tail rotor 16, it will be understood by one of skill in the art that rotor blade 34 can be successfully employed in rotor designs having more or fewer than four blades.

The design of blade 34 provides a number of advantages over traditional designs, including elimination of flight control "stiction," fail-safe structure, reduced maintenance, and a lower profile. In certain embodiments, there is little or no "dead-band" or breakout pedal force because there are no centrifugally loaded pitch change bearings. The design requires little or no maintenance due to the fact that bearings traditionally required to carry the full centrifugal force of the blade 34 while oscillating at tail rotor one-per-revolution have been eliminated. Finally, the blade-to-strap interface within the cuff section 120 provides a lower profile for reduced drag and reduces the risk of a bolted joint failure.

Figure 11:
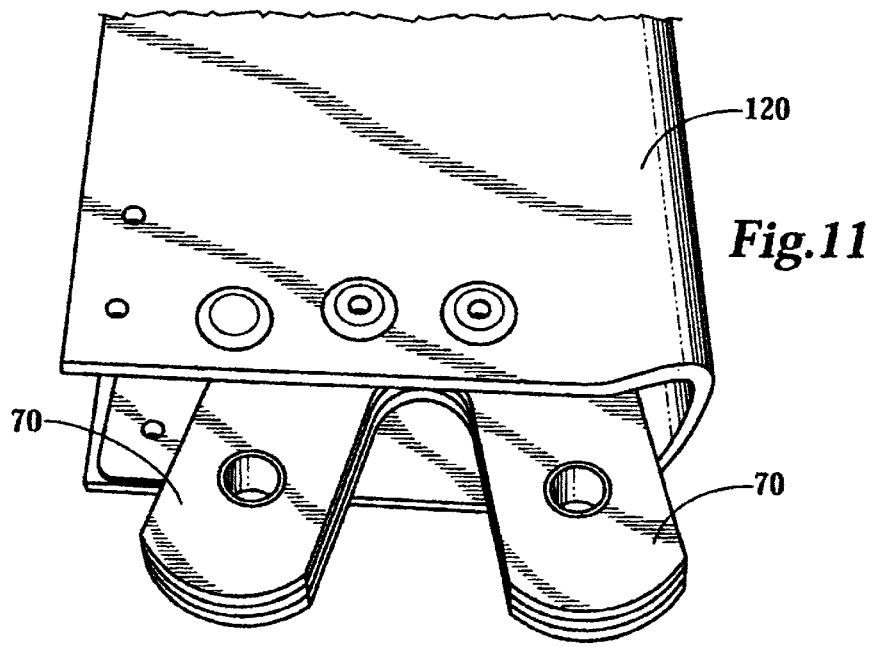
FIG. 11 is a detailed view of a rotor blade cuff according to certain embodiments of the present invention.

In certain embodiments, the cuff section 120 of blade 34, shown in FIG. 11, is a hollow airfoil shape. In one embodiment, cuff 120 is made primarily from off-axis fiberglass/epoxy tape in combination with several unidirectional layers of carbon fiber. Other constructions will be known to those of skill in the art.

The inside opening of the cuff 120 is large enough to accommodate the pitch change motion of the twist strap. The cuff 120 interfaces with the rotor yoke 32 through a shear spindle 74 bolted to its upper and lower faces, and delivers control system pitch inputs to the blade 34 through a "ring" shaped pitch horn 50. In certain embodiments, the outboard end of the cuff 120 is integral with the blade 34.

In the present invention, the twist strap 140 flares out in the inboard portion of the blade 34. Owing to the flaring of the twist strap 140, fibers in the composite material oriented parallel to the lengthwise axis of the blade 34 will have a tendency to drop off the edge of the twist strap 140, tending to create localized weaknesses in the composite matrix.

In a composite part having a constant cross-section along its primary axis of loading, such as a part having a constant rectangular cross-section, the part can easily be constructed with all fibers running along the axis of loading for the entire length of the part, if so desired. A part having a more complex geometry, such as twist strap 140, having a varying cross-section along its length, will have certain fibers running only partly down the length of the part. In certain cases, such fibers may run off the side or edge of the part.

Test data has shown that partial-length fibers terminating at the edge of a composite part have the potential to create localized stresses in the part, thereby reducing the fatigue strength of the part and creating a higher likelihood of catastrophic failure of the part.

In order to reduce the problems associated with fibers terminating at the edge of the part, certain embodiments of the present invention make use of a fiber placement layup technique, in which fibers running through sections of the part having a varying cross-section are placed into the composite belt in the form of narrow strips laid up along the edges of the part, rather than being cut from a sheet of stock fabric and laid up to run parallel to one another. Accordingly, the fibers running through these varying cross-sections are used to their fullest capacity and terminate within the part rather than passing to the edge of the part and terminating in space.

Certain embodiments of the present invention exhibit a phenomenon not seen in conventional rotor blade designs. Due of the fact that centrifugal force is transferred from the blade 34 into the strap 140 at a point midway down the blade 34, the portion of cuff 120 inboard of this point has its own centrifugal force, which manifests as a compression rather than as a tension. In conventional designs, the centrifugal force is transmitted into the yoke 32 through cuff 120. Accordingly, it is desirable that cuff 120 be both strong and lightweight.

In the rotor blade of the present invention, all centrifugal force generated by the weight of blade 34 is transmitted through strap 140. Due to the mounting structure of rotor 16, excessive weight of the rotor blade 34 places significant stress on the yoke 32 and inboard lugs 70 of rotor blade 34. Accordingly, certain embodiments of cuff 120 incorporate design features allowing for a high degree of structural integrity and torsional stiffness while minimizing weight.

FIG. 12 shows an exploded view of one embodiment of the construction of blade 34. The embodiment of blade 34 shown in FIG. 12 is constructed primarily of composite material (fiberglass/carbon/epoxy). Other materials will be known to those of skill in the art.

One novel feature of certain embodiments of the present invention relates to the manner in which the core 144 is sandwiched between the spars 154 and 156. Conventional designs incorporate a skin on the lower side and a skin on the upper side with a core sandwiched between them. In the present invention, the core 144 is sandwiched within the strap 140, with the skins 146 and 148 bonded to the outside of the sandwiched assembly of the core 144 and strap 140. In certain embodiments, integral strap 140 incorporates the spars 154 and 156 of the rotor blade 34. Spars 154 and 156 form integral parts of the outboard portion 124 of the rotor blade 34. In certain embodiments, the outboard portion of integral strap 140 is manufactured as a structure having an upper and lower half, each of which bonds to the inner surface of an upper blade skin 146 or lower blade skin 148. In certain embodiments, the integral strap 140 is bonded to upper and lower skins 146 and 148 at approximately the mid-point of rotor blade 34.

In certain embodiments, the inboard portion of skins 146 and 148 forms the cuff section 120 of blade 34. Composite filler blocks 142 and 143 at the cuff-to-strap interface support the strap 140. In certain embodiments, the trailing edge of the blade 34 is a spanwise oriented composite tape lay-up and is cured with the blade 34.

A novel design feature of certain embodiments of the present invention relates to the manner of sealing the interface. As can be seen in FIG. 12, the interface area of the blade 34 comprises multiple parts. It is important that the main structure of the blade 34 is not open to the environment and is protected from moisture. In order to prevent against the introduction of such moisture, certain embodiments of the present invention incorporate an intricate sealing assembly.

For protection of the internal structure of blade 34 from the elements, blade 34 incorporates a set of sealing closures including tip closure 151, aft root closure 153, trailing edge closure 155, leading edge closure 157, and forward root closure 159. The upper filler block 143 and the lower filler block 142 form the closure between the skins 146 and 148 and the strap 140. In certain embodiments, an abrasion strip 150 on the leading edge of blade 34 provides erosion protection against rain and sand. In the embodiment shown in FIG. 12, abrasion strip 150, closures 151–157, and lower and upper trailing edge strips 161 and 163 form integral portions of blade 34.

Assembly of the blade 34 begins with precuring of the skins 146 and 148 and strap 140. The precured structures are then bonded together into a final blade assembly 34. In certain embodiments, copper mesh integral with the blade skins 146 and 148 provides lightning protection for the blade 34. In certain embodiments, chordwise and spanwise balance provisions are incorporated at the root and tip of the blade 34.

In conventional blade designs, a single trailing edge generally runs the entire length of the blade as an integral part. In the present invention, owing to the manner in which the root closures 153 and 159 are designed, the trailing edge of blade 34 is split into upper trailing edge 163 and lower trailing edge 161. This design transfers the load into the upper skin 146 and lower skin 148 more effectively than prior known designs. As assembled, the upper trailing edge 163 and lower trailing edge 161 are together in between the upper skin 146 and lower skin 148. The load is transferred partly into the upper skin 146 and partly into the lower skin 148.

As noted above, the primary structural element of the blade 34 is the integral pitch change strap 140. FIG. 13 is an isometric view of a strap 140 after machining, while FIG. 14 is an isometric view of a strap 140 after curing but prior to machining. As seen in FIGS. 13 and 14, strap 140 transitions to form the blade spars 154 and 156 at approximately 45% of the length of the blade 34. In certain embodiments, integral strap 140 consists of all composite components, although other materials may be employed for certain applications. In certain embodiments, integral composite strap 140 comprises a combination of glass fiber and carbon fiber composites. In certain embodiments, the internal basic feathering section 160 of the strap 140 has a generally rectangular shape. In certain embodiments, a high aspect ratio helps minimize torsional stiffness for control loads and reduces flexural strains.

Additionally, it is known that the mass and density of the blade 34 along its length can have a significant effect on the performance of certain embodiments of the present invention. In particular, testing has shown that the dynamic characteristics of the blade 34 can be significantly affected by the weight at point 164. This is owing to the fact that the strap 140 is a rotating beam subjected to a combination of varying repetitive loads. Principally, these loads are imparted by aerodynamic effects.

In certain embodiments, strap 140 consists of two or more discrete composite belts. In certain embodiments, strap 140 consists of four discrete belts. In certain embodiments, unidirectional carbon fibers are introduced near the beamwise neutral axis of strap 140 in order to pick up centrifugal force (thus unloading the fiberglass) while minimizing the impact on beam stiffness. The inboard end of the strap 140 provides redundant attachment lugs 70 to transfer blade loads to the yoke 32. In various embodiments, the thickness of the attachment lugs 70 will be driven by the structural characteristics of the materials, so as to generate sufficient bearing area to react the centrifugal force, beam, and chord loads on blade 34.

It has been discovered that it is desirable to provide a gentle transition from the inboard attachment region 162 to the basic flexure section 160. This is to minimize oscillatory strains at the inboard end of the flexure section 160, maintain enough flexure length to minimize torsional stiffness, and keep the outboard blade attach point 164 as far inboard as possible for structural stability. The stiffness and mass distribution of the blade 34 are related to the oscillatory load distribution in the strap 140.

Generally, a composite part is designed so that the fibers are aligned along the principal axis of loading. In the case of a strap 140, the most efficient load path is generally found along the spanwise direction of the strap 140. Accordingly, fibers running parallel to the spanwise direction of the strap 140 at zero degrees are in an orientation in which their strength is maximized.

As noted above, test data has shown that any partial-length fibers terminating at the edge of a composite part have the potential to create localized stresses in the part, thereby reducing the fatigue strength of the part and creating a higher likelihood of catastrophic failure of the part. In order to reduce the problems associated with fibers terminating at the edge of the part, certain embodiments of the present invention make use of the above-described fiber placement layup technique, in which fibers running through sections of the part having a varying cross-section are placed into the composite belt in the form of narrow strips laid up along the edges of the part, rather than being cut from a sheet of stock fabric and laid up to run parallel to one another. Accordingly, the fibers running through these varying cross-sections are used to their fullest capacity and terminate within the part rather than passing to the edge of the part and terminating in space.

In certain embodiments, one or more of the discrete belts within the composite layup is formed by the fiber placement technique, so as to minimize or eliminate the number of fibers running into an edge of the part. In certain embodiments, the fiber placement technique uses relatively narrow strips of fiberglass or carbon fiber. In certain embodiments, an automated machine head follows a contour of the strap 140 to place each strip on a flatbed tool. As each discrete belt is fiber placed on the flatbed tool, it is removed from the machine. In certain embodiments, the strips are approximately 0.125" wide. After the discrete belts are formed, the discrete belts are placed into a strap lay-up tool or a fixture along with filler plies and shear plies, as described in detail below.

The above-described layup method is in contrast to traditional composite manufacturing methods, which incorporate parallel fibers in a fabric-type matrix having a certain principal orientation. In a composite part having a constant cross-section along its primary axis of loading, such as a part having a constant rectangular cross-section, the part can easily be constructed with all fibers running along the axis of loading for the entire length of the part, if so desired. A part having a more complex geometry, such as strap 140, having a varying cross-section along its length, may have certain fibers running only partly down the length of the part. Indeed, a complex part made using standard composite fabric will necessarily incorporate certain fibers running only part of the way down its length.

In addition to the fiber placement technique described above, certain embodiments of the present invention make use of unique laminates in order to maximize strength while at the same time minimizing the weight of the part. As can be seen in FIGS. 13 and 14, the strap 140 has a constant thickness from point 160 on. In this section, strap 140 incorporates the same number of fibers. Inboard of point 160, however, the strap 140 gradually increases in thickness. This thickness is created by the addition of plies to the composite structure. In certain embodiments, the additional plies are placed at +/−45 degrees off the zero degree axis in order to increase the shear strength of the strap 140. In certain embodiments of the present invention, certain plies are carbon fiber in order to increase the axial strength of the strap 140.

FIG. 14 is an isometric view of a strap 140 after curing but prior to machining. After machining, the strap 140 will appear as shown in FIG. 13. The cross-section of strap 140 varies along the length of strap 140, particularly within the portion of strap 140 between inboard attach region 162 and blade attach point 164. The cross-section of strap 140 across sections 15, 16, and 17 is shown in detail in FIGS. 15, 16, and 17, respectively.

Figure 15:
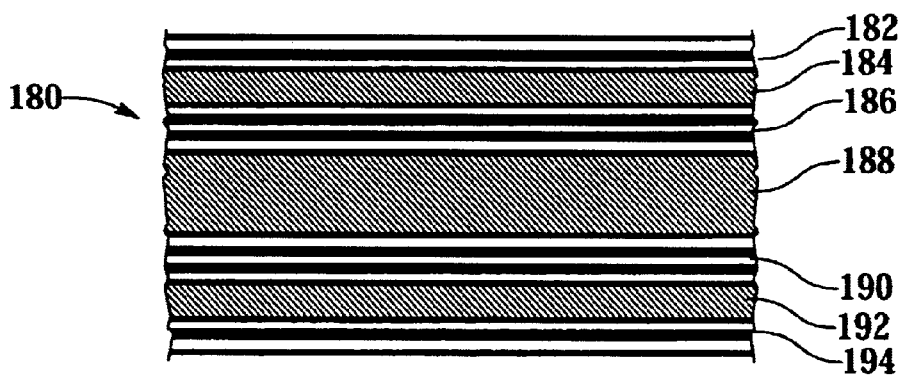
FIG. 15 is a cross section of the inboard section of an unmachined flexural strap according to certain embodiments of the present invention.

The cross-section of strap 140 within the inboard attach region 162 is shown in FIG. 15 and generally designated

180. Cross-section 180 comprises, in sequence, a set of plies 182 oriented along the lengthwise axis of the strap 140, a set of shear plies 184 disposed alternately at +45 degrees and −45 degrees off of the lengthwise axis of the strap 140, a second set of plies 186 oriented along the lengthwise strap axis, and a set of core shear plies 188 at +/−45 degrees. Plies 190–194 are mirror images of plies 182–186.

In certain embodiments, there are two each of plies 182 and 194 composed of fiberglass. In certain embodiments, there are 14 each of plies 184 and 192, also composed of fiberglass. In certain embodiments, there are two each of plies 186 and 190, with each pair comprising one fiberglass and one carbon fiber ply. In certain embodiments, there are 34 core shear plies 188, all fiberglass.

Figure 16:
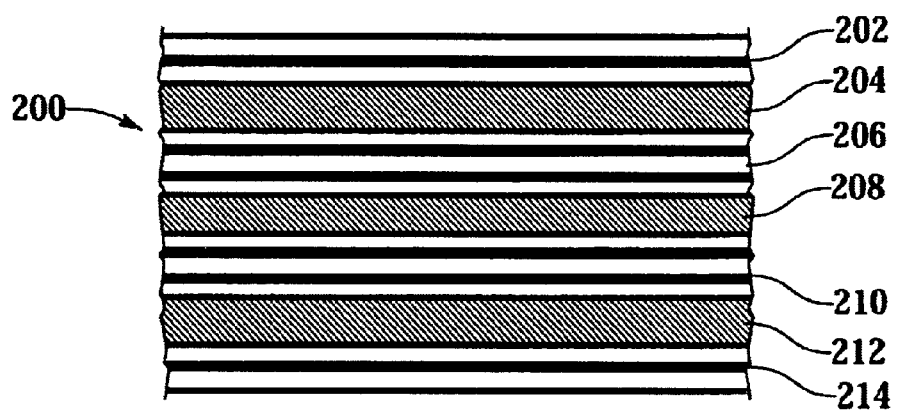
FIG. 16 is a second cross section of the inboard section of an unmachined flexural strap according to certain embodiments of the present invention.

The cross-section of strap 140 near the outboard end of the attach region is shown in FIG. 16 and generally designated 200. Cross-section 200 comprises, in sequence, a set of plies 202 oriented along the lengthwise axis of the strap 140, a set of shear plies 204 disposed alternately at +45 degrees and −45 degrees off of the lengthwise axis of the strap 140, a second set of plies 206 oriented along the lengthwise strap axis, and a set of core shear plies 208 at +/−45 degrees. Plies 210–214 are mirror images of plies 202–206.

In certain embodiments, there are two each of plies 202 and 214 composed of fiberglass. In certain embodiments, there are 14 each of plies 204 and 212, also composed of fiberglass. In certain embodiments, there are two each of plies 206 and 210, with each pair comprising one fiberglass and one carbon fiber ply. In certain embodiments, there are 11 core shear plies 208, all fiberglass.

Figure 17:
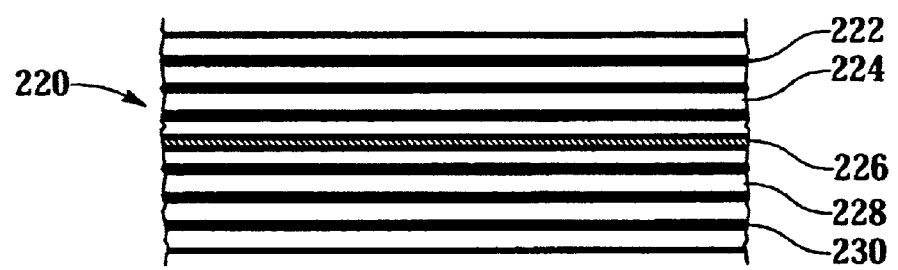
FIG. 17 is a cross section of a flexural section of an unmachined flexural strap according to certain embodiments of the present invention.

The cross-section of strap 140 within the flexural region is shown in FIG. 17 and generally designated 220. Cross-section 220 comprises, in sequence, a first set of plies 222 oriented along the lengthwise axis of the strap 140, a second set of plies 224 oriented along the lengthwise strap axis, and a set of core shear plies 226 disposed alternately at +45 degrees and −45 degrees off of the lengthwise axis of the strap 140. Plies 228 and 230 are mirror images of plies 222 and 224.

In certain embodiments, there are two each of plies 222 and 230 composed of fiberglass. In certain embodiments, there are two each of plies 224 and 228, with each pair comprising one fiberglass and one carbon fiber ply. In certain embodiments, there are 2 core shear plies 226, both fiberglass.

Figure 20:
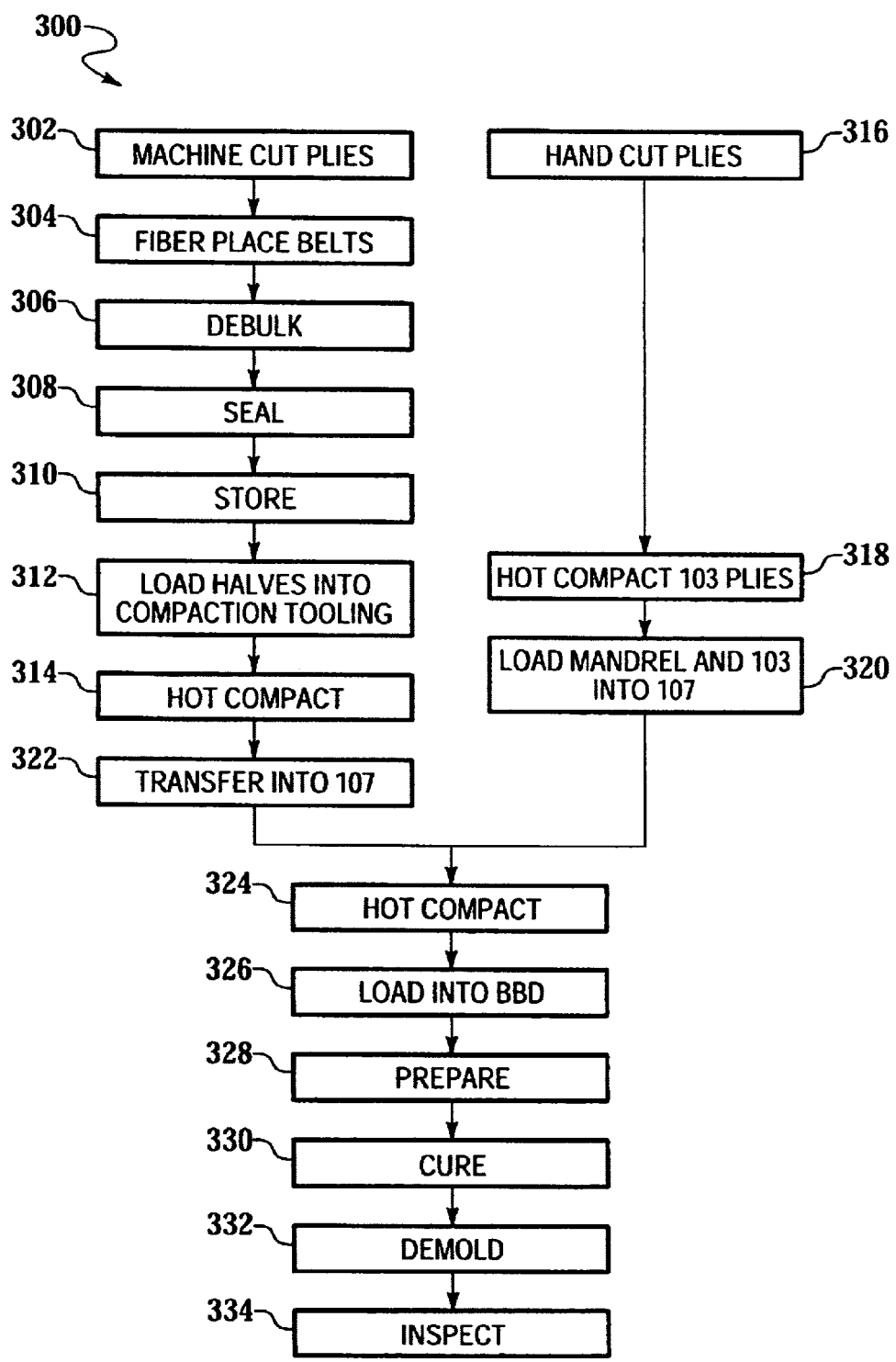
FIG. 20 is a flowchart depicting the flexural strap assembly and curing process according to certain embodiments of the present invention.

The process of manufacturing strap 140 is shown in detail in FIG. 20, in flowchart 300. The manufacturing process begins with the cutting of the ply material from stock rolls or sheets. Certain plies are machine cut (302), while other plies are hand cut (316). After cutting (302), the machine cut plies are fiber placed (304), debulked (306), sealed (308) and stored (310) until needed for further processing. When needed for such further processing, the machine cut plies are loaded into compaction tooling (312) and hot compacted (314).

With respect to the hand cut plies, these plies are hot compacted (318) and loaded, along with a mandrel, into bond tooling (107). The hot compacted machine cut plies are then transferred into the tooling with the hand cut plies (322), and the combination is then hot compacted (324). After hot compacting (324), the strap is loaded into a BBD (326), prepared (328), cured (330), demolded (332), and inspected (334). After inspection (334), the strap 140 is ready for further processing, as described below.

Figure 21:
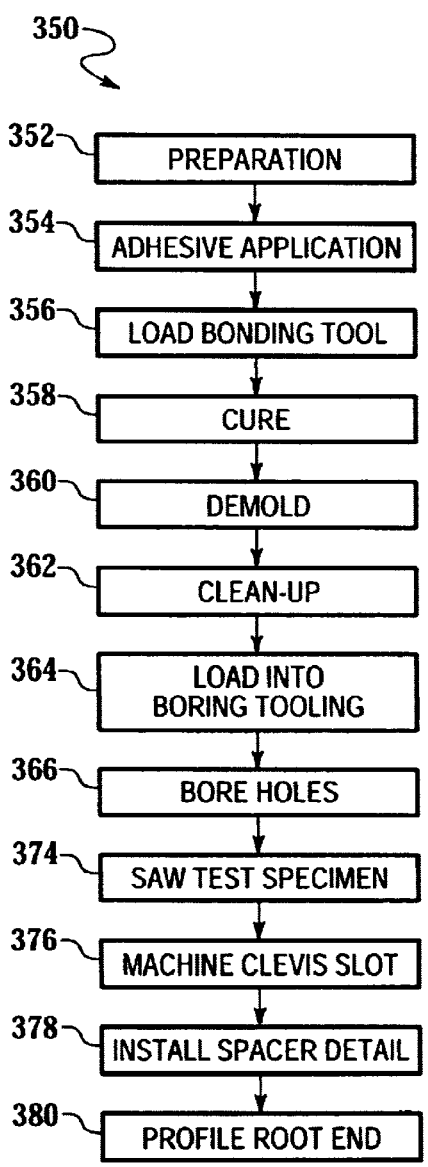
FIG. 21 is a flowchart depicting the flexural strap and block assembly process according to certain embodiments of the present invention.

The process of manufacturing a finished strap/block assembly is shown in detail in FIG. 21, in flowchart 350. The manufacturing process begins with preparation (352) of the strap 140 and blocks 142 and 143 for adhesive application. Adhesive is then applied (354) between the strap 140 and blocks 142 and 143, and the assembly is loaded (356) into bond tooling, cured (358), demolded (360), and cleaned up (362).

After clean-up (362), the bonded assembly is loaded (364) into boring tooling and the lug holes are bored (366). A test specimen is then sawed (374) from a portion of the strap 140 for testing, the clevis slot is machined (376) in the root end of the strap 140, a spacer detail is inserted (378) into the machined clevis slot and the root end is profiled (380). After the above processing, the root end of the strap 140 has the appearance depicted in FIG. 13.

Figure 22:
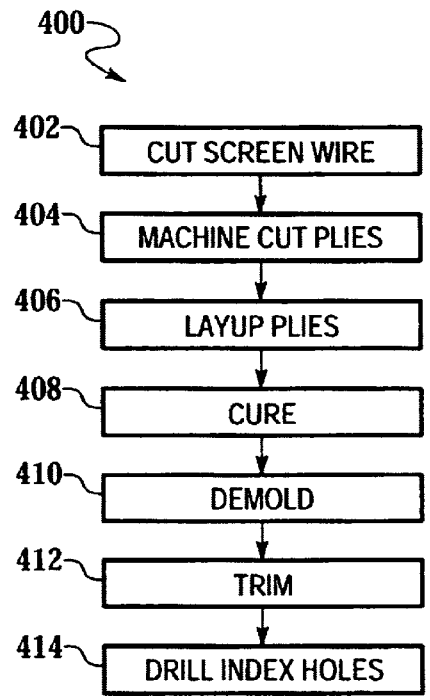
FIG. 22 is a flowchart depicting the blade skin assembly and curing process according to certain embodiments of the present invention.
Figure 23:
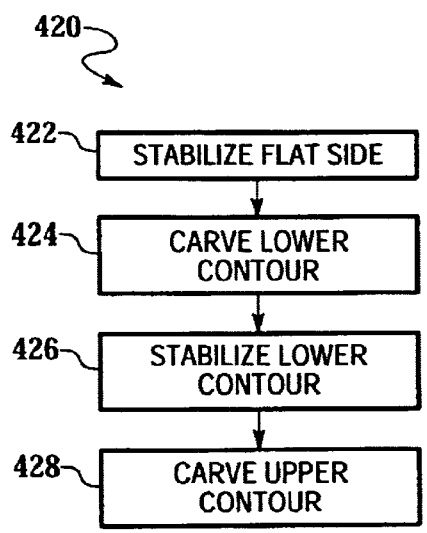
FIG. 23 is a flowchart depicting the core preparation process according to certain embodiments of the present invention.

The preparation of skin assemblies 146 and 148 and core assembly 144 are shown in FIGS. 22 and FIG. 23, respectively in the form of flowcharts 400 and 420. As seen in flowchart 400 of FIG. 22, assembly of the skins begins with cutting (402) of the conductive screen wire to the proper size and shape. The skin plies are then machine cut (404), laid up in a mold (406), and cured (408). After curing, the skins 146 and 148 are demolded (410), trimmed (412), and drilled (414) with the correct index holes.

The preparation of core assembly 144 is shown in FIG. 23 in flowchart 420. One flat side of a rectangular block of honeycomb material is first registered and stabilized (422) against a flat surface. The non-planar lower contour is then carved (424) into the exposed side of the honeycomb opposite the flat surface. The lower contour is then registered and stabilized (426) against a tool having the correct matching contour and the upper contour is carved (428) into the exposed flat surface of the honeycomb opposite the contoured tool.

Figure 24:
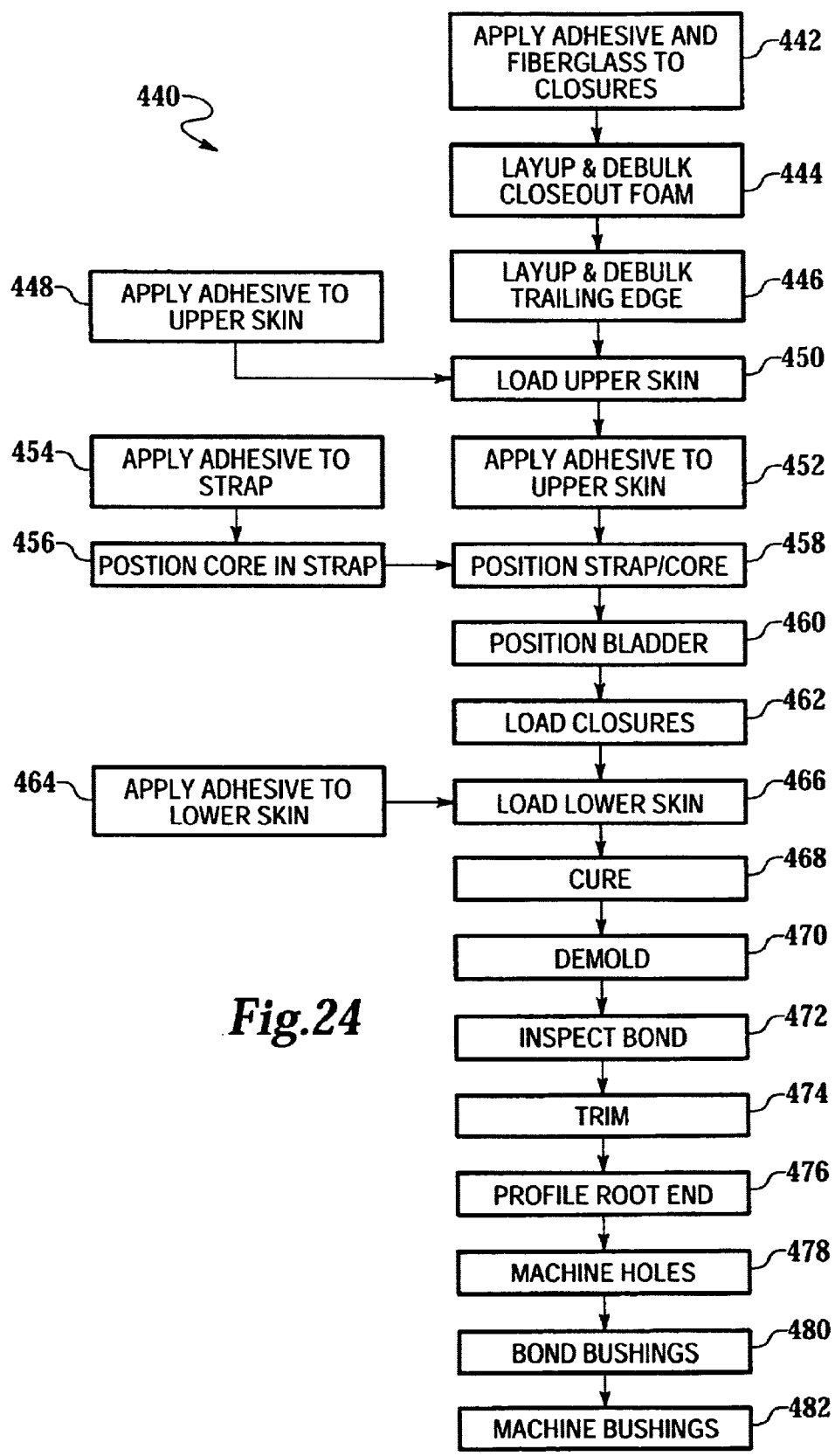
FIG. 24 is a flowchart depicting the final blade assembly and machining process according to certain embodiments of the present invention.

The method of assembly of the blade 34 is shown in FIG. 24 in flowchart 440. The process begins with the application (442) of adhesive and fiberglass to the blade assembly closures. The blade assembly closeout foam is then laid up and debulked (444), followed by the trailing edge (446).

Adhesive is applied (448) to the upper skin 146, which is then loaded (450) into the tool, and coated (452) with adhesive. Adhesive is then applied (454) to the strap 140 and the honeycomb core 144 is positioned therein (456). The strap/core subassembly is loaded (458) into the tool, followed by the cuff bladder (460). After positioning of the strap 140, the closures are loaded (462). In a similar manner to that employed for the upper skin 146, the lower skin 148 is then coated (464) with adhesive and loaded (466) into the tool.

After assembly of all subcomponents, the blade assembly within the tool is cured (468), demolded (470), and inspected (472). The assembly is then trimmed (474) and the root end of the cuff 120 is profiled (476). Final assembly and machining of the blade 34 includes machining (478) of the root end holes, bonding (480) of the root bushings, and final machining (482) of the root bushings.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A helicopter tail rotor blade assembly comprising:

a flexural strap having an inboard end and an outboard end, the inboard end being adapted for coupling to a rotor hub, and the outboard end forming an upper spar and a lower spar;

a core member disposed between the upper spar and the lower spar;

an upper skin bonded to the upper spar having an inboard end and an outboard end;

a lower skin bonded to the lower spar having an inboard end and an outboard end;

a rotor cuff formed by the inboard ends of the upper skin and the lower skin, the rotor cuff being disposed about the flexural strap;

a blade portion formed by the outboard ends of the upper skin and the lower skin;

a pitch change mechanism coupled to the rotor cuff for selectively adjusting the pitch of the blade portion; and a shear spindle coupled to the rotor cuff and being adapted for coupling to a rotor hub, so as to provide a blade shear load path to a rotor hub;

wherein the flexural strap is adapted to twist about its lengthwise axis in response to actuation of the pitch change mechanism.

2. The helicopter tail rotor blade assembly according to claim 1, further comprising:

a sealing means for providing a seal between the upper and lower skins and the flexural strap.

3. The helicopter tail rotor blade assembly according to claim 2, wherein the sealing means comprises:

filler blocks disposed between the upper and lower spars and the upper and lower skins;

a tip closure disposed at the outboard ends of the upper and lower skins;

an aft root closure disposed on the aft side of the inboard end of the upper and lower spars;

a forward root closure disposed on the forward side of the inboard end of the upper and lower spars;

a leading edge closure disposed on the forward side of the inboard end of the flexural strap; and a trailing edge closure disposed on the aft side of the inboard end of the flexural strap.

4. The helicopter tail rotor blade assembly according to claim 1, wherein the shear spindle comprises:

an inboard end having a shear pin; and an outboard end having a forked clevis with one clevis arm being coupled to the upper side of the rotor cuff and the other clevis arm being coupled to the lower side of the rotor cuff.

5. The helicopter tail rotor blade assembly according to claim 4, wherein the shear spindle further comprises:

coning stops for limiting blade coning when the helicopter tail rotor blade assembly is not in use.

6. The helicopter tail rotor blade assembly according to claim 4, further comprising:

a restraint fitting adapted for coupling to a rotor hub for rotatably receiving the shear pin.

7. The helicopter tail rotor blade assembly according to claim 1, wherein the pitch change mechanism is a ring-shaped pitch horn attached to the both the upper surface and the lower surface of the rotor cuff.

* * * * *